(12) United States Patent
Veyseh et al.

(10) Patent No.: US 9,854,592 B2
(45) Date of Patent: Dec. 26, 2017

(54) METHODS OF CHANNEL ALLOCATION FOR DEVICES USING DIFFERENT COMMUNICATION PROTOCOLS

(71) Applicant: SITUNE CORPORATION, San Jose, CA (US)

(72) Inventors: Marzieh Veyseh, Los Altos, CA (US); Vahid Mesgarpour Toosi, Mountain View, CA (US)

(73) Assignee: SITUNE CORPORATION, San Jose, CA (US)

( * ) Notice: Subject to any disclaimer, the term of this patent is extended or adjusted under 35 U.S.C. 154(b) by 104 days.

(21) Appl. No.: 15/078,873

(22) Filed: Mar. 23, 2016

(65) Prior Publication Data
US 2016/0323897 A1    Nov. 3, 2016

Related U.S. Application Data

(63) Continuation-in-part of application No. 14/521,310, filed on Oct. 22, 2014.

(51) Int. Cl.

| | |
|---|---|
| *H04W 72/08* | (2009.01) |
| *H04W 72/04* | (2009.01) |
| *H04L 29/06* | (2006.01) |
| *H04L 12/28* | (2006.01) |
| *H04B 1/00* | (2006.01) |
| *H04L 12/64* | (2006.01) |
| *H04L 12/66* | (2006.01) |
| *H04W 88/10* | (2009.01) |

(52) U.S. Cl.
CPC ........ *H04W 72/085* (2013.01); *H04B 1/0064* (2013.01); *H04L 12/283* (2013.01); *H04L 12/6418* (2013.01); *H04L 12/66* (2013.01); *H04L 69/18* (2013.01); *H04W 72/048* (2013.01); *H04W 72/082* (2013.01); *H04L 2012/2841* (2013.01); *H04W 88/10* (2013.01)

(58) Field of Classification Search
CPC ............ H04W 72/085; H04W 72/048; H04W 72/082; H04W 88/10; H04W 72/85; H04W 72/48; H04W 72/04; H04L 69/18; H04L 12/66
See application file for complete search history.

(56) References Cited

U.S. PATENT DOCUMENTS

| | | | | |
|---|---|---|---|---|
| 8,254,481 | B1 * | 8/2012 | McCloskey | H04K 1/10 375/130 |
| 2002/0197973 | A1 * | 12/2002 | Yoshimoto | H03D 7/18 455/302 |
| 2007/0066254 | A1 * | 3/2007 | Tsuchie | H04B 1/0014 455/183.2 |
| 2014/0003260 | A1 * | 1/2014 | Tabet | H04W 76/028 370/252 |

* cited by examiner

*Primary Examiner* — Lakeram Jangbahadur
(74) *Attorney, Agent, or Firm* — Hogan Lovells US LLP

(57) ABSTRACT

Various examples describe systems and methods for dynamically and simultaneously assigned channels among multiple nodes in a network that communicates using multiple communication protocols. Aspects of the exemplary examples may include a wireless hub comprising an RF front end receiver that can capture, demodulate and decode a pre-defined band in its entirety. The wireless hub can include one or more medium access control algorithms for assigning channels for multiple nodes to access the pre-defined band while reduces contention between the nodes that are communicating with the wireless hub.

18 Claims, 15 Drawing Sheets

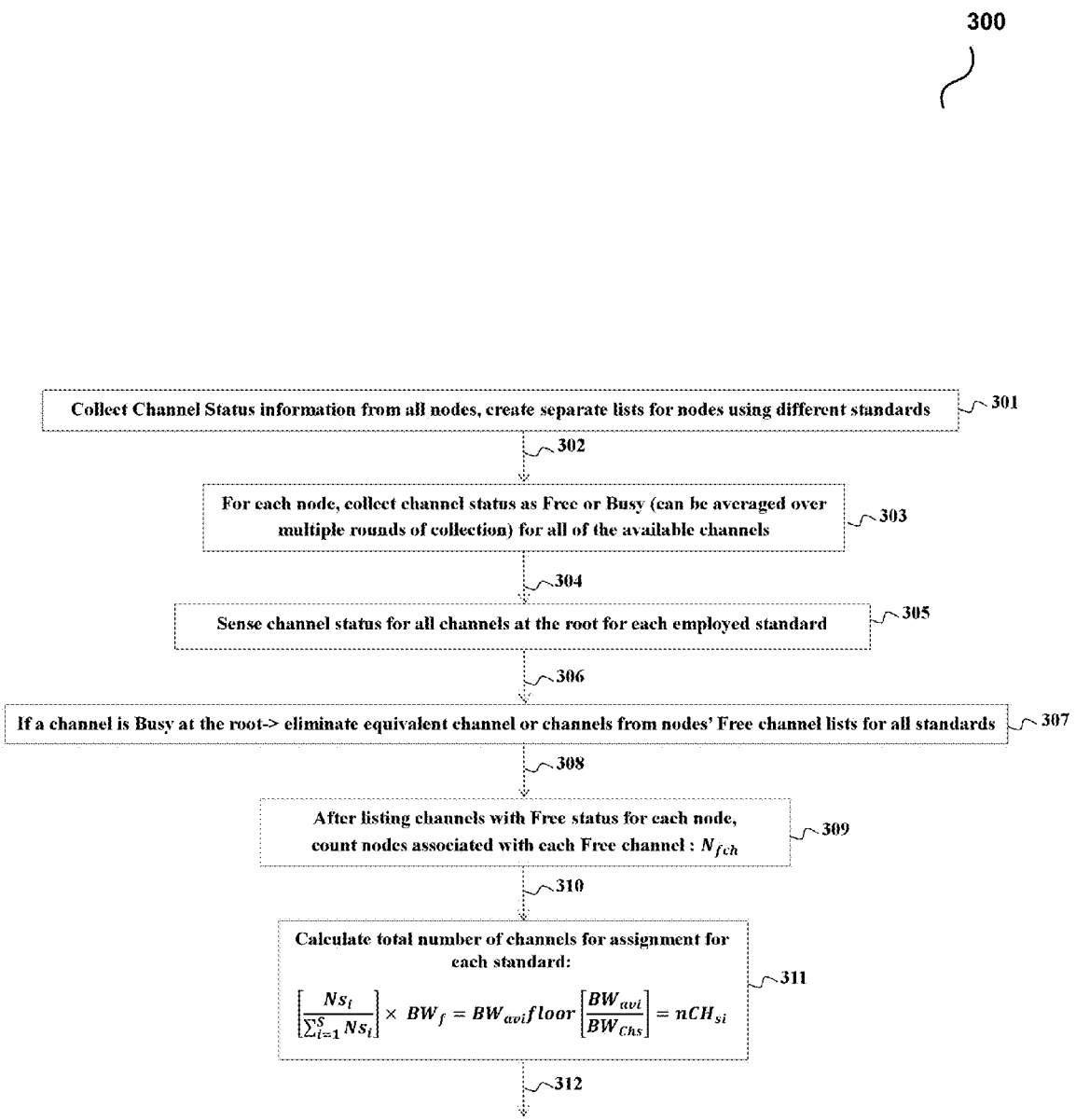
FIG. 3 (continued on next page)

METHODS OF CHANNEL ALLOCATION FOR DEVICES USING DIFFERENT COMMUNICATION PROTOCOLS

RELATED APPLICATIONS

This application is a continuation-in-part application of U.S. non-provisional application Ser. No. 14/521,310, filed Oct. 22, 2014, and entitled "SYSTEM AND METHOD FOR MULTI-STANDARD SIGNAL COMMUNICATIONS," which claims the benefit of U.S. provisional application 61/977,016, filed Apr. 8, 2014, and entitled "METHODS, SERVICES, SYSTEMS, AND ARCHITECTURES FOR HARMONY, A SMART MESH HUB FOR INTERNET OF THINGS," and is a continuation-in-part of U.S. non-provisional application Ser. No. 14/586,492, filed Dec. 30, 2014, and entitled "COMMUNICATIONS BETWEEN CONNECTED DEVICES," the disclosure of which is hereby incorporated herein by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE PRESENT TECHNOLOGY

This disclosure relates generally to a method, system and apparatus for multiple nodes using multi-standard communications in wireless networks. More specifically, disclosed are systems and methods that enable wireless communications for devices using different wireless transmission protocols.

BACKGROUND

The success of user devices (e.g., computing devices such as computers, cameras, appliances, etc.) may be substantially determined by their ability to communicate with other user devices and the World Wide Web. For example, in a conceptual environment (e.g., Internet of Things (IoT)), devices can communicate with each other and the World Wide Web via various communication protocols. The conceptual environment may include, but is not limited to, home automation, health care, emergency response, intelligent shopping, smart product management, environmental sensing, smart meters, waste management, and urban planning.

One challenge in IoT applications is to add connections within a contention region where available network spectrum is limited. Transmissions from neighboring wireless devices may interfere with each other. For example, for a device to be connected, it usually need use a portion of the spectrum (e.g., wireless band) to send messages to an appropriate receiver. However, when other devices within the contention region also attempt to access the same portion of spectrum, collisions and access delay can become a problem. The problem will likely get worse as the number of devices increases. As more devices attempt to access the same spectrum, more contention between the devices is created and, as a result, some connection attempts may fail.

Further, the issues can get worse when devices use popular wireless bands such as the Industrial, Scientific and Medical Radio Band of 2.4 GHz which is also used by other standards based on different channel definition within the bands. For applications using these bands, IEEE 802.11 and IEEE 802.15.4 are typically used to share the spectrum and avoid collisions by switching channels in such a way that there is no overlap among utilized channels around neighboring devices. However, if channel allocations within each network are handled independent of other networks on the same band, some important resources (e.g., wireless band) may be wasted or underutilized.

Traditional techniques attempted to separate channels into non-overlapping groups and allow each technology to use channels of its assigned group. Since the channels do not overlap across groups, packet collision can be avoided. However, the exclusivity of channels between different technologies means that the bandwidth assigned to silent group(s) can be wasted.

Other techniques attempted to categorize nodes using the same standard into one group (or cluster) and assign a different channel to each group or cluster of nodes. However, the issue is that a hub is required to act as a cluster head and handle data collection within each cluster. Multiple hubs can tremendously increase costs and the complexity of an IoT and sensor network and negates the purpose of the network.

Therefore, there is a need for solutions to better manage bandwidth distribution among various nodes using different standards within the band.

SUMMARY

Systems and methods in accordance with various examples of the present disclosure may overcome one or more of the foregoing or other deficiencies experienced in conventional approaches for wireless communication. In particular, various examples are provided for dynamically and simultaneously assigned channels among multiple nodes in a network that communicates using multiple communication protocols. Aspects of the exemplary examples may include a wireless hub comprising an RF front end receiver that can capture, demodulate and decode a pre-defined band in its entirety. The wireless hub can include one or more medium access control algorithms for assigning channels for multiple nodes to access the predefined band while reduces contention between the nodes that are communicating with the wireless hub.

In some examples, a RF front end receiver of a wireless hub can capture messages simultaneously sent over non-overlapping channels of a pre-defined band. Some such techniques are described in co-pending U.S. patent application Ser. No. 14/714,772, filed May 18, 2015, entitled "Radio Frequency Tuner," and co-pending U.S. patent application Ser. No. 14/714,910, filed May 18, 2015, entitled "Dynamic Gain Assignment in Analog Baseband Circuits," which are hereby incorporated herein by references in their entirety. Each non-overlapping channel occupies a different part of the spectrum. Messages communicated over the non-overlapping channel can be transmitted via different pre-defined standards. This is greatly advantageous since employing multiple radios leads to implementation complexities and increased power consumption and cost. Therefore, such a system has never been fully utilized in wireless networks specially sensor networks and IoT applications.

Some examples provide a channel assignment algorithm at a wireless hub to dynamically distribute channels among nodes that communicate with the wireless hub, and a power adjustment algorithm to ensure proper signal reception of the entire band and conserve transmission power. For example, when a node wakes up, it first waits for the hello messages and channel assignment signals from the hub. In response the node sends channel status information back to the hub. The hub then uses the information it has received from all nodes and dynamically assigns a non-conflicting channel for the node to communicate. Channels are then assigned based on local interference at different nodes. This is advantageous over conventional techniques that all nodes use the same channel since interference in one area does not stop transmissions on other areas where channel selection can be different.

For another example, the power adjustment algorithm can be used by a wireless hub to determine a suitable signal transmission power. The suitable signal transmission power can be determined based at least upon a distance between a corresponding node and a wireless hub, as well as received signal power of other nodes that utilize neighboring channels within the spectrum and an assigned transmission power level for an employed standard of the corresponding node.

In some examples, an interference handling algorithm can be used to combine a channel assignment algorithm and power adjustment algorithm to dynamically manage channel assignments among multiple nodes in a network that are communicating with a wireless hub via a same standard or different standards.

Examples of this application can be applied to various applications, such as home automation, health care, emergency response, intelligent shopping etc., and result in substantially higher network density (i.e., more numbers of nodes can be used within a geographical area), reduced transmission delay, and better energy efficiency.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only exemplary examples of the disclosure and are not therefore to be considered to be limiting of its scope, the principles herein are described and explained with additional specificity and detail through the use of the accompanying drawings in which.

DETAILED DESCRIPTION

Figure 1:
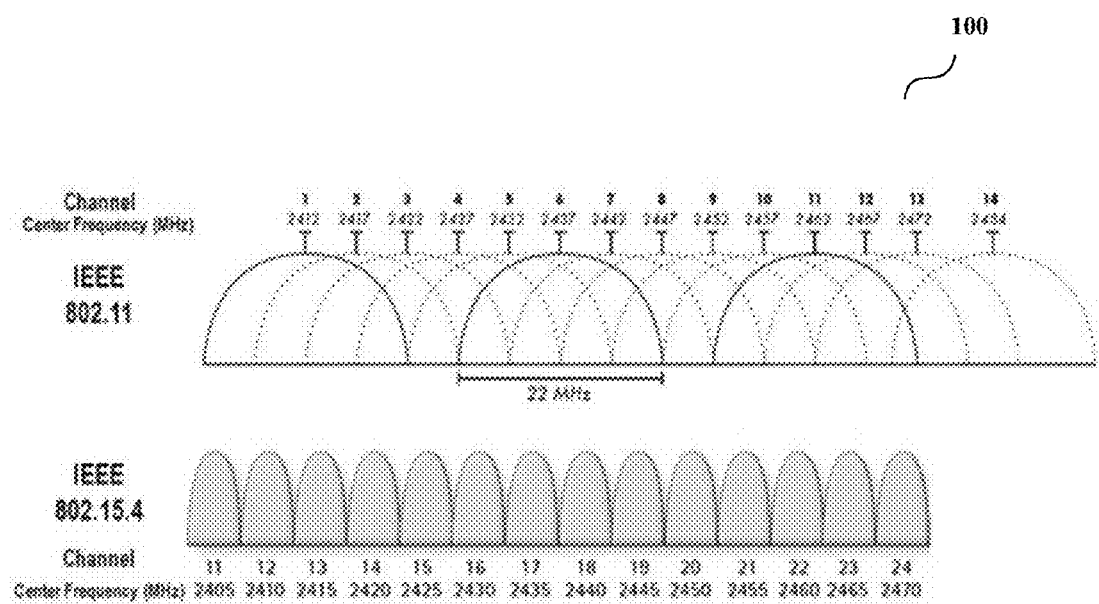
FIG. 1 illustrates an example channel definition of a wireless spectrum in accordance with various examples.

Systems and methods in accordance with various examples of the present disclosure may overcome one or more of the foregoing or other deficiencies experienced in conventional approaches for wireless communication. In particular, various examples or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

The future of user devices may be influenced by their corresponding ability to communicate to other user devices and the World Wide Web. In this way, most user devices (e.g., TVs, appliances, lightings, etc.) may have sensors, actuators, and transceivers and have the ability to communicate with each other. For various applications such as home automation devices can make decisions based on information they receive from other devices without the involvement of the network owner. For instance, the coffee maker can start making coffee when the motion sensor detects movement near the kitchen in the morning time, or the hallway lights turn on before the front door is open. All "things" that we deal with on a daily basis can become smart and make our lives easier. To achieve this, it is desired that these devices are capable of communicating wirelessly with each other.

The present technology enables a coordinator or a centralized hub to connect to and communicate with a number of user devices. The hub can be connected to a network and control devices (e.g., phones or smart tablets). The control devices can directly communicate with the hub and coordinate connected devices via embedded applications on the control devices.

One problem of convention technologies is that many popular standards designed and reserved for a platform (e.g., IEEE 802.11 and IEEE 802.15.4) sharing wireless bands. The wireless band is usually divided into multiple channels. For each standard, different channel definitions are introduced. For network nodes, the available band/spectrum is shared among all neighbors when their radio uses a wireless standard based on that spectrum. Typically, only one channel can be used by each node for any popular IoT standards. Therefore, multiple nodes using the same standard have to compete for the same channel; while other nodes using other standards compete for their respectively assigned channels. To avoid interference, competing nodes using different standards is recommended to avoid using the same channels. Meanwhile, sharing only one channel by nodes that utilize the same standard means that there will be contention. Contention can be a major limitation to increase a network density in number of nodes and reduce transmission delays. A transmission delay is a transmission time for a message starting from entering a node's transmission queue to being received by a receiver's radio.

The present technology utilizes an available band in a network efficiently such that computing nodes in the network can concurrently use different parts of the available band to reduce contention. As a result, more nodes can be added to the network without causing undue transmission delays. The present technology solves limitations in convention solutions where coordinators and hubs in a network can only capture and receive a single transmission over a single channel for IoT standards, and nodes in the network need to share the single channel via Carrier Sense Multiple Access with Collision Avoidance (CSMA/CA). When CSMA/CA is used as the medium access technique, the average throughput (i.e., a number of successfully received bits) per node decreases as number of neighboring nodes (i.e., proportional to a density of the nodes) increases up to a maximum possible value.

Aspects of the exemplary examples may include a transceiver radio comprising an RF front end receiver that can capture, demodulate and decode a pre-defined band entirely as well as medium access algorithms for managing channel access when multiple nodes try to access the band. The RF front end radio can capture messages sent over the pre-defined band concurrently when messages are sent over non-overlapping channels and each channel is occupying a different part of the spectrum. Using this Radio, the need to implement multiple RF front ends can be eliminated and, thus, overcome the limitations (e.g., a number of possible radios and difficult to attain) associated with multiple RF front ends.

Examples of the present technology herein describe a hub that utilizes a full band capture radio that can receive the entire spectrum all at once and separate different bands within the specific spectrum. The bands are defined based on different standards, as illustrated in FIG. 1. FIG. 1 illustrates an example channel definition of a wireless spectrum 100 in accordance with various examples. In this example, two standards, 802.11 and 802.15.4 (ZigBee), both utilizing the 2.4 GHz band, are illustrated.

The present technology presents a solution to use the aforementioned radio and create a hub that can simultaneously receive transmissions on both standards on non-overlapping channels. The hub can manage assignments of channel and signal transmission power to various nodes such that the entire band can be fully utilized at most times and, thus, makes it possible to concurrently receive data from various nodes using different standards. As a result of this disclosure, a channel throughput can be greatly improved as well as channel access time. Therefore, nodes in a network only need a minimum amount of wait time to be able to successfully transmit corresponding packets to a desired destination (e.g., hub) in the network.

Figure 2:
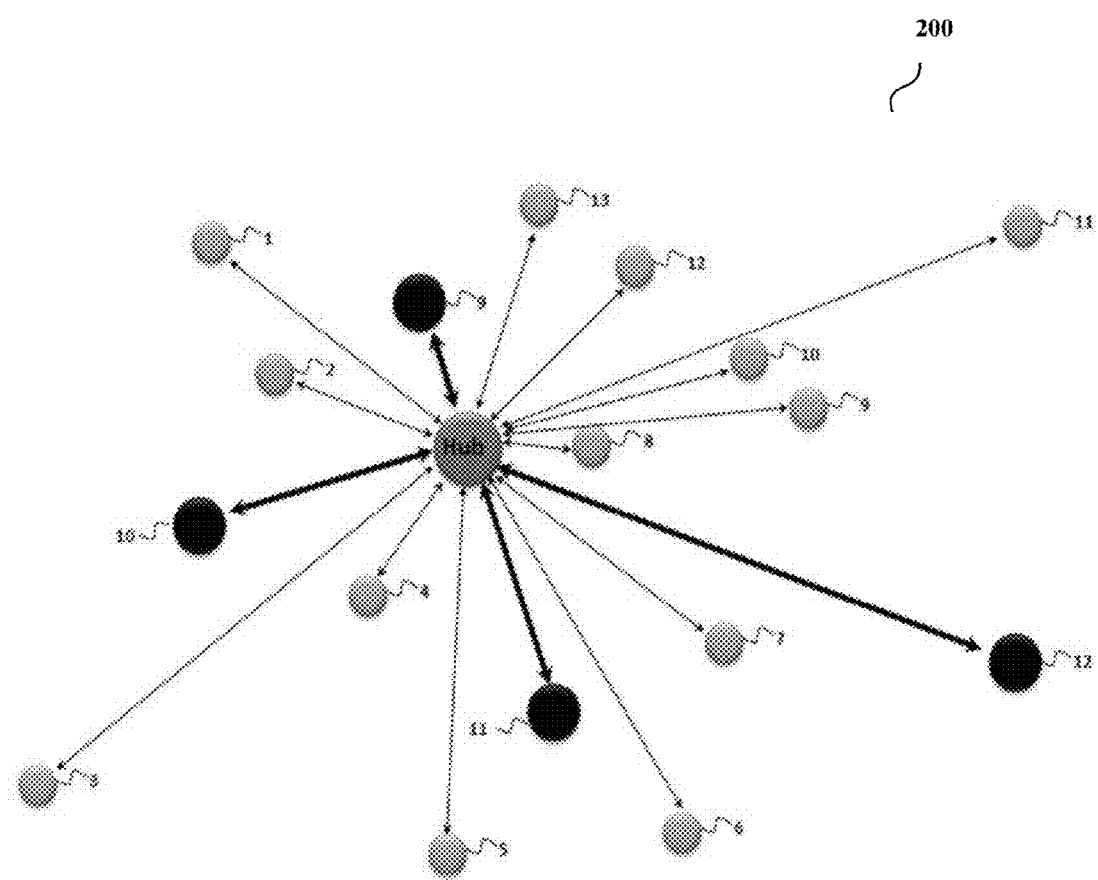
FIG. 2 illustrates an example wireless hub and nodes in accordance with various examples.

FIG. 2 illustrates an example wireless hub and nodes 200 in accordance with various examples. In this example, the network of nodes is clustered to groups. In each group, there is a root and some children nodes. The children nodes in each cluster produce data and send information to a root of a corresponding cluster. A root can also create clusters among roots and create a hierarchy of clusters in order to eventually send gathered data back to a coordinator that acts as a sink for all the gathered data. The root is called a hub in FIG. 2. In this examples, a cluster with a root and multiple children nodes with wireless technologies based on two different standards. Nodes 1-8 and 12-13 are using the 802.11 standard while nodes 9-12 are using the ZigBee standard.

Some examples of the present technology provide at least one of a channel assignment algorithm for nodes across technologies, power adjustment algorithm for nodes across technologies, and/or an interference avoiding algorithm for nodes across technologies. An optimized number of nodes that can communicate with a single hub depends on an efficiency of channel assignment. The present technology enables higher network throughput and less transmission delays, comparing with conventional solutions, and thus allows more nodes to be grouped into a single cluster. For instances, to maintain a specific channel delay in this network, a node has to be silenced if a corresponding delay is higher than a threshold value. With less transmission delays, more nodes can be activated in each cluster. More nodes in a cluster translates to less hubs are needed to keep a corresponding network active and, thus, directly results in less network deployment cost.

In some examples, a transmission range of the children is shorter than their corresponding distances to a coordinator/top root or a maximum number of nodes in one cluster is reached. A root can collects messages from its children nodes in a cluster and re-sends the messages to a further-away coordinator/top root. In this scenario, children nodes consume less power to transmit data to a closer root comparing to transmit data to a further-away coordinator, even if a transmission range of the children nodes can support transmitting messages within a corresponding geographical distance. Longer battery life (e.g., longer run time on a full charge) can be achieved for the children nodes. The coordinator can couple the clustered network to the Internet and end users.

In some examples, a tuner of the present technology can simultaneously receive multiple transmissions on non-overlapping parts of a spectrum. A hub can utilize "wasted" parts of the spectrum. In conventional wireless radios, all nodes using a specific technology must share a specific channel and wait for each other until they can win their rights to send their packets. If a number of nodes are too high, waiting time can be long enough that corresponding nodes are considered silence. On the other hand, the rest of the spectrum (i.e., spectrum not occupied by the specific channel) may be under-utilized since nodes with the specific technology can only receive data on the specific channel. In examples of the present technology, a receiver can receive data on an entire spectrum. Therefore, "wasted" parts of the spectrum can be utilized to increase network throughput and performance using some exemplary algorithms of the present technology (e.g., a channel assignment algorithm across technologies, interference avoidance across technologies and power assignment algorithm across technologies).

Figure 3:
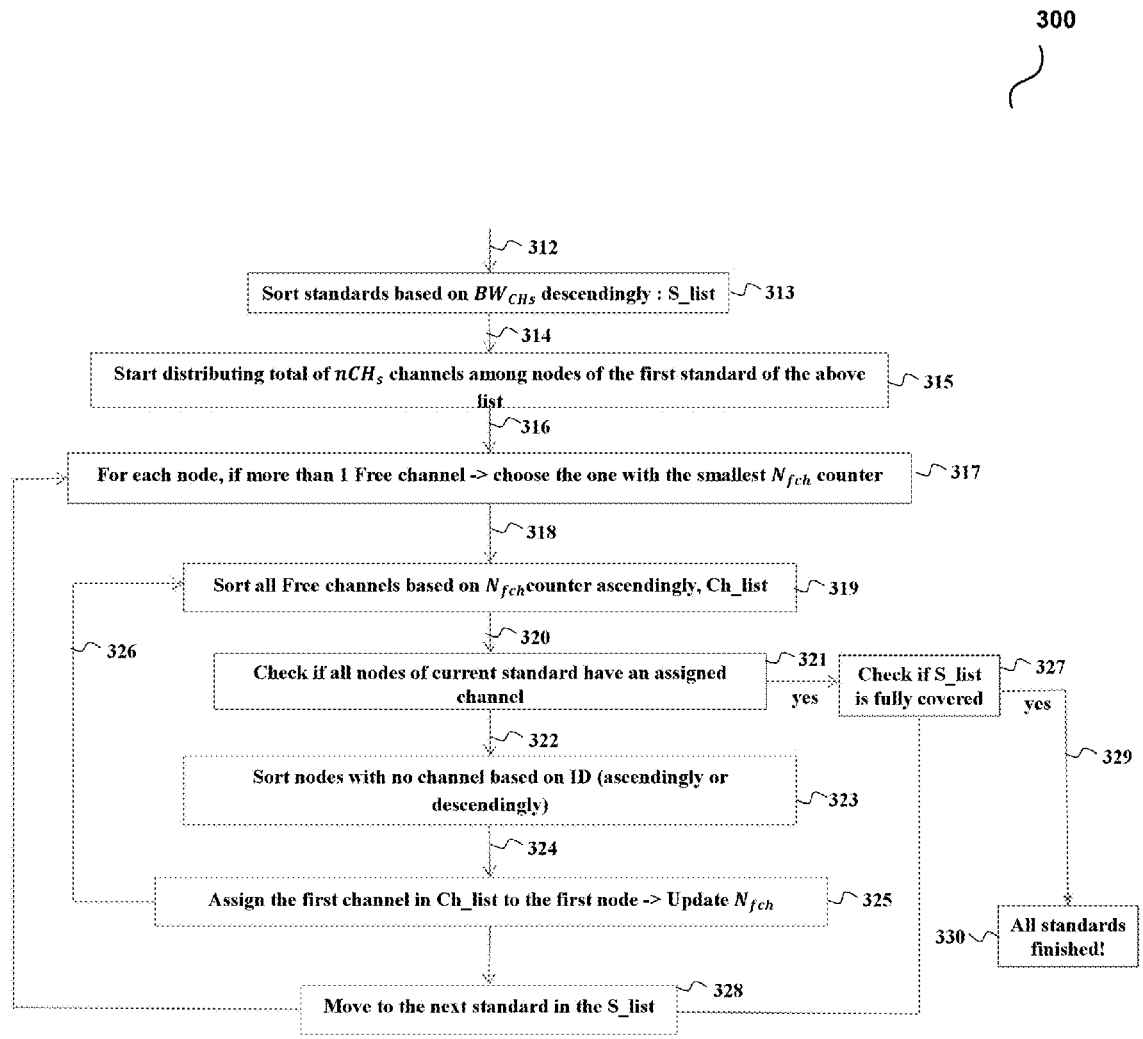
FIG. 3 illustrates an example channel assignment across technologies (CAT) algorithm in accordance with various examples.

FIG. 3 illustrates an example channel assignment across technologies (CAT) algorithm 300 in accordance with various examples. In some examples, the CAT algorithm is responsible for distributing channels among nodes in a network. There are limited channels available for distribution depending on standards, channel contention, and a number of nodes using each standard. For instances, one of major standards used in Internet of Things (IoT) is 802.15.4, which has 16 available channels. The CAT algorithm enables implementation of hubs that allow multiple 802.15.4 devices to simultaneously use different unoccupied 802.15.4 channels while considering occupied channels by other interfering technologies such 802.11. A hub can receive and demodulate messages sent over these non-overlapping channels concurrently. According to some examples, the CAT algorithm can detect and find channels that are available in a spectrum and free to be used (e.g., no other user around that a specific node is using the channels for data transmission).

According to some examples, the CAT algorithm can assign free channels in a network to nodes in the network and keep channel usages among the nodes as evenly distributed as possible. Thus, contention among nodes in the network can be kept at a minimum level. In some examples, the CAT algorithm can determine distribution of channels between nodes among different technologies (e.g., 802.11 and 802.15.4) based on a number of active nodes using each technology.

It should be understood that the exemplary method 300 is presented solely for illustrative purposes and that in other methods in accordance with the present technology can include additional, fewer, or alternative steps performed in similar or alternative orders, or in parallel. The exemplary method 300 starts at 301, a hub gathers channel status information of nodes in a network, for example nodes 1-13 as illustrated in FIG. 2. In some examples, all nodes that use a pre-defined control channel (i.e., set by a network designer) and CSMA/CA medium access protocol can send corresponding channel status information to the hub. In some examples, the hub can collect the channel status information from all nodes two or more times to ensure a better accuracy. The channel status information collected from each node may include two optional statuses for each of the available channels: "Busy_status" or "Free_status". Busy_status means that a corresponding channel might be used by neighbor nodes of a sensing node, and/or at the sensing node, a noise level at this specific channel may be above a threshold noise level, so it's "Busy." On the other hand, Free_status means that a corresponding channel is not used by neighbor nodes of a sensing node, and/or at the sensing node, a noise level at this specific channel may be below the threshold noise level, so it's "Free." Channels are then assigned based on local interference at different nodes. This is advantageous over conventional techniques that all nodes use the same channel since interference in one area does not stop transmissions on other areas where channel selection can be different. The hub can create separate lists for different standards. A list for a specific standard may include associated nodes that employ the specific standard and corresponding channel status information of the associated nodes using the specific standard.

At step 305, the hub checks statuses of channels for all employed standards in the network. For example, the hub can sense a noise level around at a hub radio for each channel and standard, and assign a Busy or Free flag for each channel based on a corresponding measurement of the noise level. If a channel is Busy around the hub, the hub can eliminate the channel from free channel lists (i.e., nodes cannot transmit on the channel that is already sensed with a high noise level at the receiver (root)), at step 307.

At step 309, the hub lists one or more channels with free status for each node ("Free channel list") and counts how many nodes that include a specific channel as a free channel. For example, a counter "$N_{fch}$" can be used. The counter "$N_{fch}$" can be from 0 to a total number of channels. Each channel can have an associated "$N_{fch}$".

At step 311, the hub calculates a total number of channels to be assigned to each group of nodes communicating with a specific standard. For examples, a percentage of nodes using each standard is calculated by dividing a number of nodes employing standard i ($N_{Si}$) to a total number of nodes employing all standards and then multiply that by total free available bandwidth $BW_f$, which results in $BW_{avi}$, an available bandwidth for nodes employing standard i. Floor of $BW_{avi}$ divided by an associated channel bandwidth of standard i, $BW_{Chs}$, is a number of standard specific channels that can be assigned to each group of nodes.

$$\left[\frac{Ns_i}{\sum_{i=1}^{s} Ns_i}\right] \times BW_f = BW_{avi}$$

$$\text{floor}\left[\frac{BW_{avi}}{BW_{Chs}}\right] = nCH_{si}$$

At step 313, employed standards can be sorted as a standard list (e.g., S_list) descendingly based on standard specific channel bandwidth ($BW_{Chs}$). At step 315, channels assigned to a specific standard can be distributed among nodes communicating with the specific standard.

At step 317, for a node having more than one free channel in its list, a channel with a lowest number of assigned nodes can be assigned to the node. For example, the hub chooses a channel that has the smallest $N_{fch}$ counter (which means that it has been listed less than the other channel) to ensure uniform selection of channels for nodes. $N_{fch}$ counter is then updated, for example, after one round of channel selection for each node.

At step 319, the hub sorts all channels into a channel list based on nodes assigned to corresponding channels ascendingly. For example, all channels can be sorted with the smallest $N_{fch}$ being the first and channels with the largest $N_{fch}$ counter being the last.

At step 321, all nodes are checked to determine whether each node has an assigned channel. In response to determining that one or more nodes do not have any assigned channels, the hub sorts the one or more nodes having no assigned channels into an unassigned node list based on IDs of the one or more nodes either ascendingly or descendingly, at step 323.

At step 325, a first channel from the channel list can be assigned to a first node from the unassigned node list. In response to determining that all nodes have at least one assigned channel and the standard list is complete, the exemplary method 300 completes at step 330.

In response to determining that the standard list is not complete, the exemplary method 300 moves to a next standard in the standard list, at step 328, and back to the step 317 for nodes in the next standard group.

Figure 4:
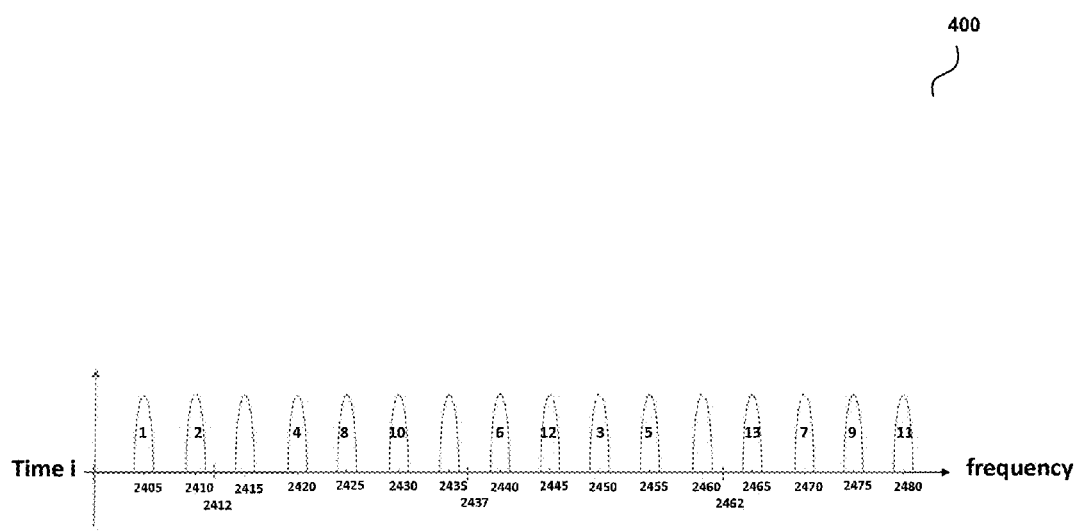
FIG. 4 illustrates an example channel allocation for some nodes of FIG. 2 in accordance with various examples.

FIG. 4 illustrates an example channel allocation 400 for some nodes of FIG. 2 in accordance with various examples. In this example, 802.15.4 is an employed standard for all active nodes and there is no interferer in the 2.4 GHz band between the active nodes. There are 13 active nodes as shown in FIG. 2, each of which is assigned a channel.

Figure 5:
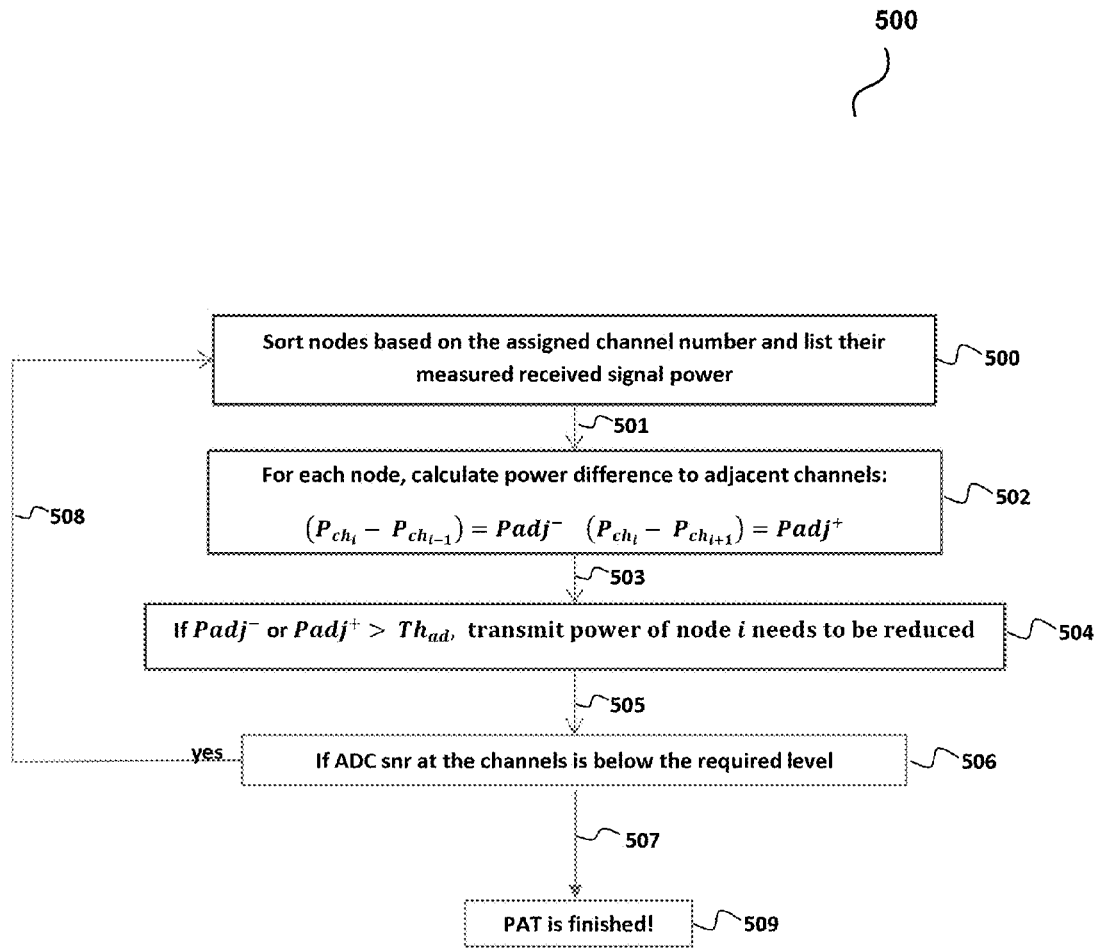
FIG. 5 illustrates an example power adjustment across technologies (PAT) algorithm in accordance with various examples.

FIG. 5 illustrates an example power adjustment across technologies (PAT) algorithm 500 in a network in accordance with various examples. In some examples, the PAT algorithm 500 can determine a suitable transmission power for each node in the network such that total spectrum reception at a hub of the network is not disturbed by an unnecessary high signal power from a specific node that is close to the hub. By managing transmission power of the nodes, the hub can control energy consumption of the nodes and optimize battery power on the nodes. In some examples, the hub can the CAT algorithm first and then run the PAT algorithm to adjust transmission power of the nodes in the network if it deems necessary. For example, if a node is close to the hub and uses a relatively high transmission power for its signal transmission, adjacent-channel-interference at the hub might increase and surpass a threshold value for a successful total-spectrum-reception. The hub may manage transmission power of the node based at least upon a distance between the node and the hub.

The exemplary method 500 starts at 502, a hub can sort nodes in the network based on assigned channel numbers ascendingly. In some examples, the hub sorts the nodes and lists measured signal power on corresponding channels when the hello messages (i.e., initialization signaling) were received at the hub. Nodes are sorted only after the hub has successfully received data from the nodes. A node is not sorted if it has not yet successfully sent corresponding data information to the hub.

At step 504, for each node, the hub determines a difference between received signal power of the node and adjacent channels at the hub. For examples, the difference between received signal power of the node and adjacent channels (e.g., $Padj^-$ and $Padj^+$) can be compared with a maximum possible value of an adjacent-channel-rejection threshold, $Th_{ad}$, in a predetermined total-spectrum-reception radio.

At step 506, in response to either of the $Padj^-$ or $Padj^+>Th_{ad}$, the hub can cause a corresponding node to reduce transmission power based upon an assigned transmission power level of an employed standard. In some examples, the hub can send a signal to the corresponding node to reduce its transmission power based on the assigned transmission power level of the standard employed by the node.

At step 508, the hub can check a signal-to-noise ratio (SNR) level of a corresponding channel of the node. In response to determining that the SNR level is below the threshold SNR value, the exemplary method 500 goes back to step 502. For example, other nodes are checked to make sure they are not using unnecessary levels of transmission power that can cause adjacent-channel interferences.

In response to determining that the SNR level is above a threshold SNR value, the exemplary method 500 completes at step 510.

Figure 6:
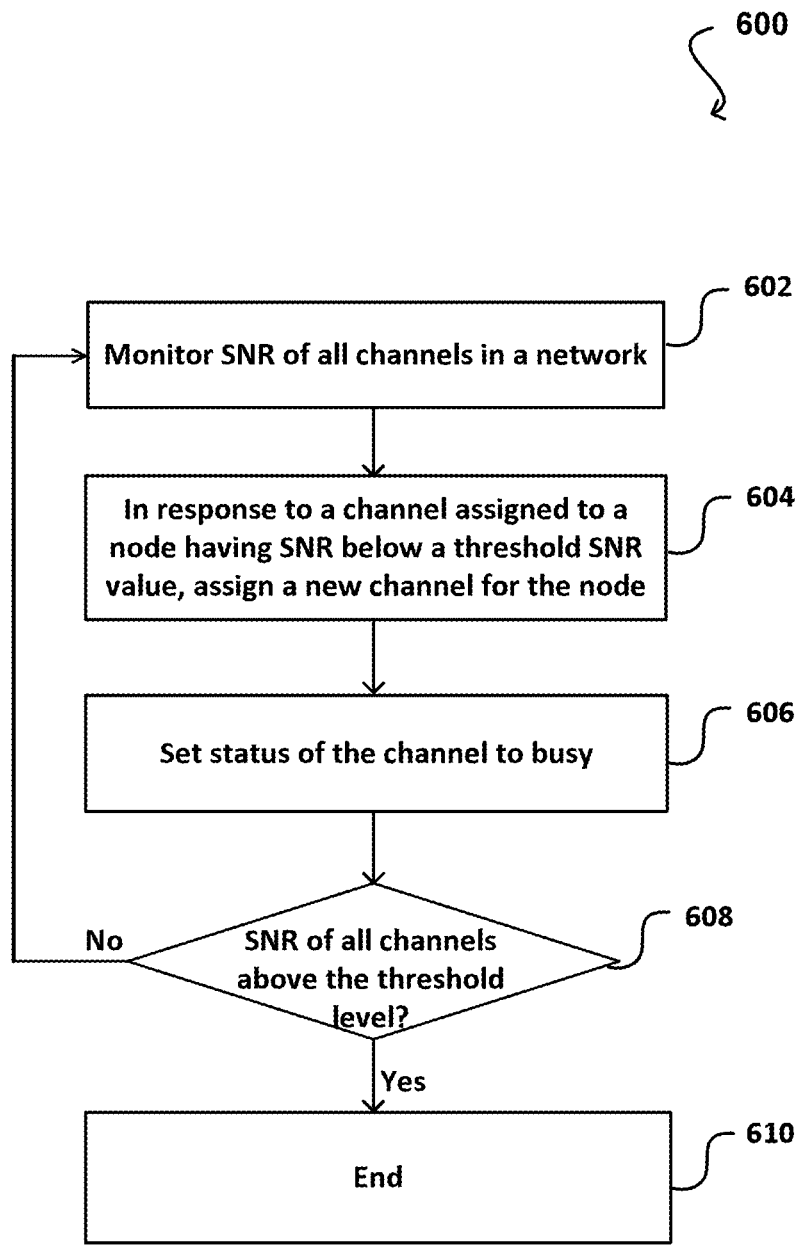
FIG. 6 illustrates an example interference handling across technologies (IAT) algorithm in accordance with various examples.

FIG. 6 illustrates an example interference handling across technologies (IAT) algorithm 600 in a network in accordance with various examples. In some examples, the IAT algorithm can dynamically adjust channel assignments among nodes to minimize interferences between nodes in the network. For example, a new transmission via a channel may cause interferences at the channel that is being used by other node(s). When a hub detects signal losses at the channel that was previously successful, the hub can eliminate the channel from assigning to additional node(s) and consider a status of the channel as "Busy". In some examples, the hub can further a CAT algorithm among all nodes or affected nodes to re-distribute the affected node to available channel(s).

The exemplary method 600 starts at 602, a hub of the network monitors SNR levels of all channels in the network that have successful data reception. At step 604, in response to determining that a channel assigned to a node has a SNR below a threshold SNR value or a noise level above threshold noise level, the hub can assign the node to a new channel.

At step 606, the hub can set status of the channel as busy to prevent the channel from being assigned to any additional node. At step 608, the hub determines whether SNRs of all channels in the network are above the threshold SNR level.

In response to determining any channel having a SNR level below the threshold SNR level, the exemplary method 600 goes back to step 602. In response to determining that the SNRs of all channels in the network are above the threshold SNR level, the exemplary method 600 completes at step 610.

Figure 7:
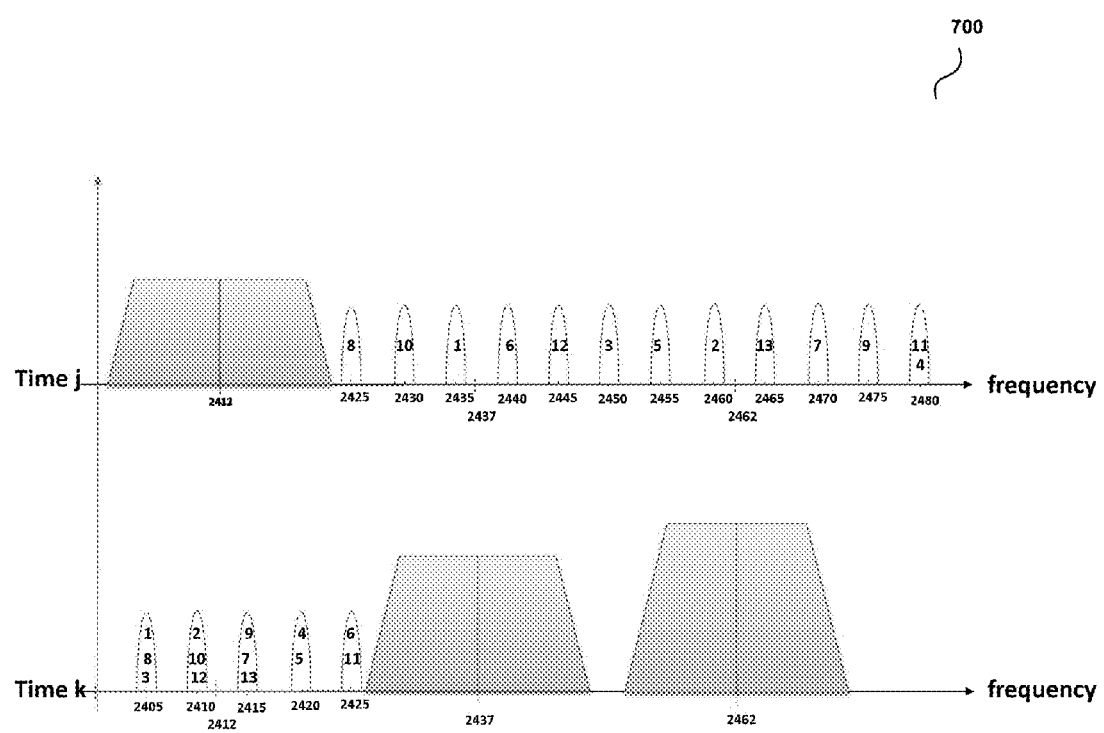
FIG. 7 illustrates an example channel allocation using the IAT algorithm of FIG. 6 in accordance with various examples.

FIG. 7 illustrates an example channel allocation 700 in a network using the IAT algorithm of FIG. 6 in accordance with various examples. In this example, nodes in the network can be dynamically assigned to different parts of available band from a time k to a time j such that minimized interferences between nodes can be achieved. As a result, a hub can maintain a minimized transmission delay and optimized energy efficiency for the nodes in the network.

FIGS. 8-14 illustrate example results of network simulations via OMNeT++ tool to simulate and illustrate some example advantages of utilizing multi-channel networks proposed in the present technology. In these examples, effects of employing a hub that can simultaneously receive messages from different nodes on non-overlapping channels within the aforementioned 2.4G band are illustrated. These simulations are carried out in a star topology network in which there is a root and a number of children nodes collecting data and sending the data back to the root based upon an average message inter-arrival time, as illustrated in FIG. 2. The children nodes are assumed to be awake during the course of these simulations. The messages are generated based on a normal distribution with an average value of a chosen λ, such that inter-arrival time values for aperiodic events, $t_s$, are defined to follow an exponential probability distribution function. Individual time values can be generated through the use of a uniformly random variable, R, with the formula: (λ can be parametrized and available for all nodes.)

$$t_s = \frac{-\ln(1 - R)}{\lambda}$$

The root is assumed to use the aforementioned receiver that can digitalize the entire band and receive data simultaneously from non-overlapping channels, however, the same RF radio is also responsible for transmission of messages from the root to a children node and only one of the channels (i.e. channel 0) is used for an individual transmission to one children node while transmissions from the root to different children nodes do not overlap in time. In these simulations, 802.15.4 is chosen as a physical layer and Mac layer implemented standard. In these examples, there are 16 non-overlapping channels in 802.15.4. One of the 16 channels (i.e. channel 0) is used for transmission from the root to the children nodes while 15 of the 16 channels are used for transmissions from children nodes to the root. During an initial stage of the protocol (i.e. neighbor discovery/hello message exchange/message exchanges for channel assignment algorithm), channel 0 is used for all communications through CSMA/CA channel access technique.

These simulations are conducted using various application layer packet sizes and various average inter-arrival times. Packet sizes are chosen in a range of a smallest packet size of 48 B to a largest packet size of 1280 B (considering that a maximum 802.15.4 packet size is 128 B, larger packets are fragmented and sent to lower layers). An average packet inter-arrival time or $t_s$ is chosen from 50 ms to 5 s, considering that 50 ms is for faster applications while 5 s is for slower applications in IoT monitoring systems.

Figure 8:
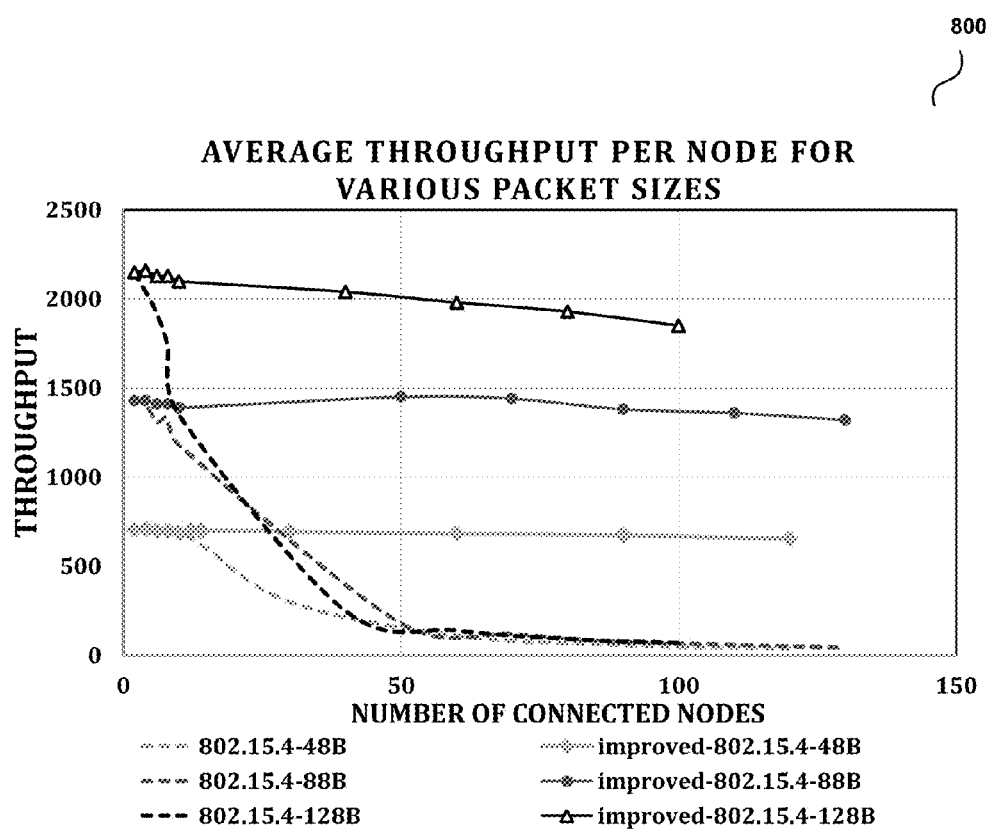
FIGS. 8-14 illustrate example results of network simulations via OMNeT++ tool to simulate and illustrate some example advantages of utilizing multi-channel networks proposed in the present disclosure.

FIG. 8 illustrates average throughput per node as:

$$\text{Throughput} = \frac{\text{Number of packets succesfully received at the root} \times \text{packet size}}{\text{number of children} \times \text{simulation time}}.$$

This example illustrates substantial throughput improvement attained via the present technology. As a number of children nodes connected to the root increases, this improvement is more apparent. The results show that the concept of the present technology is effective for various packet sizes.

Figure 9:
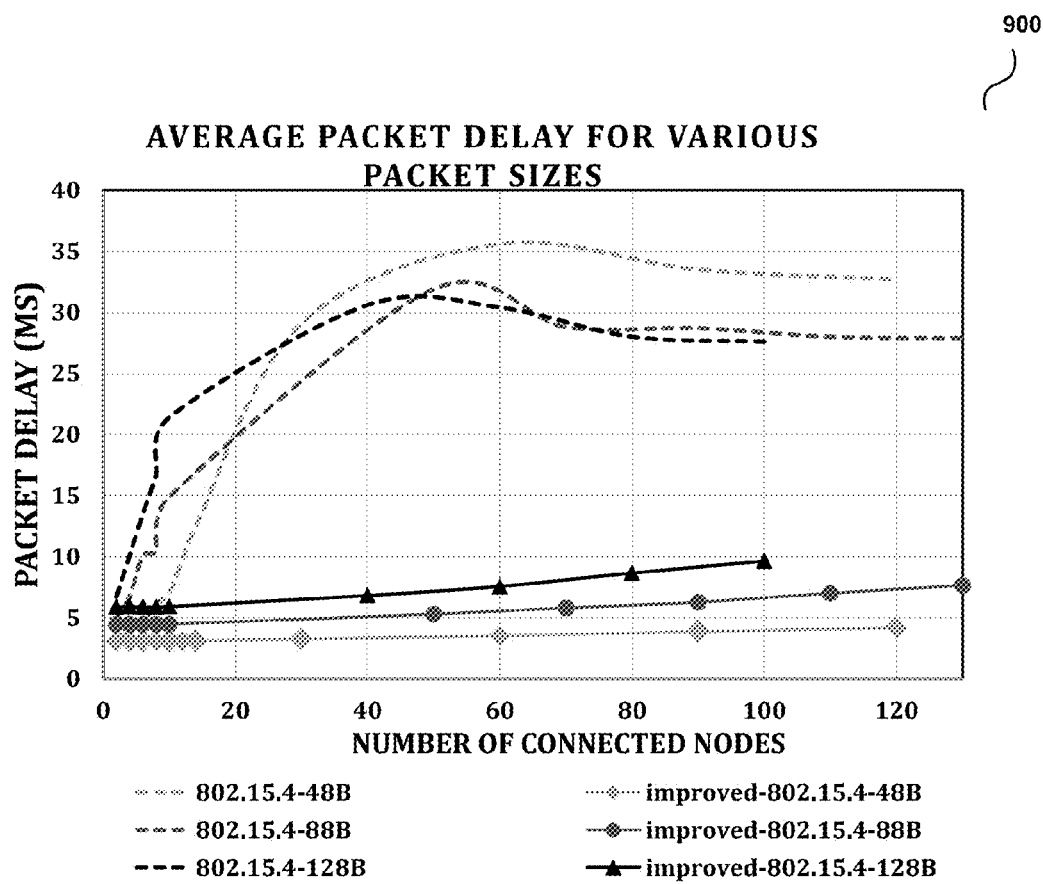

FIG. 9 illustrates an average packet delay in accordance with various examples of the present technology. In this example, the average packet is calculated by dividing an accumulated time that it takes each packet to get to the root's application layer from a time that the packet was generated at a child node's application layer, by a number of packets that were successfully received:

$$\text{Average packet Delay} = \frac{\text{Total time spent by all packets to get to the root's application layer}}{\text{Numbers of packets successfully received}}$$

This example illustrates that an average packet delay is substantially reduced via the present technology as a number of connected nodes increases. The reduction in packet delays is due to a fact that more free channels become available using the present technology. At a given point in time, a wait time for packets to access a collision-free and less noise channel is reduced.

Figure 10:
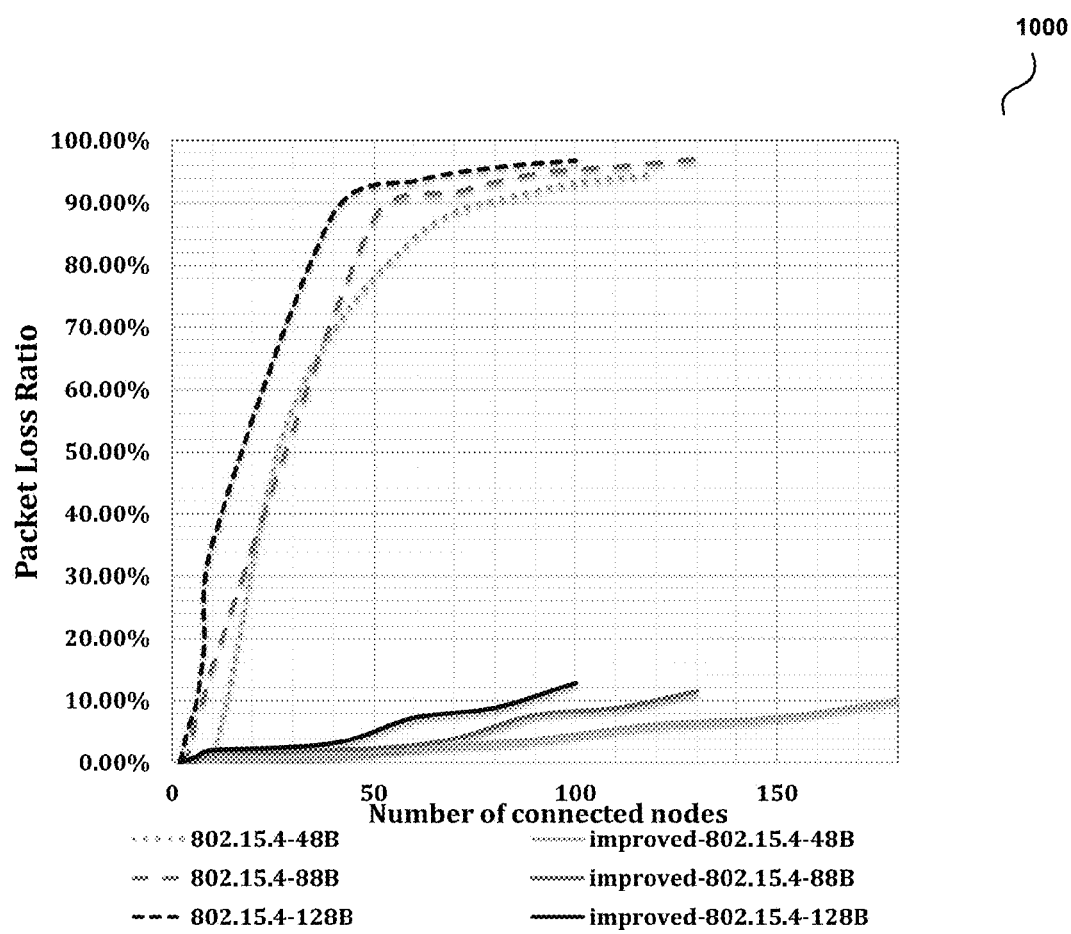
Figure 11:
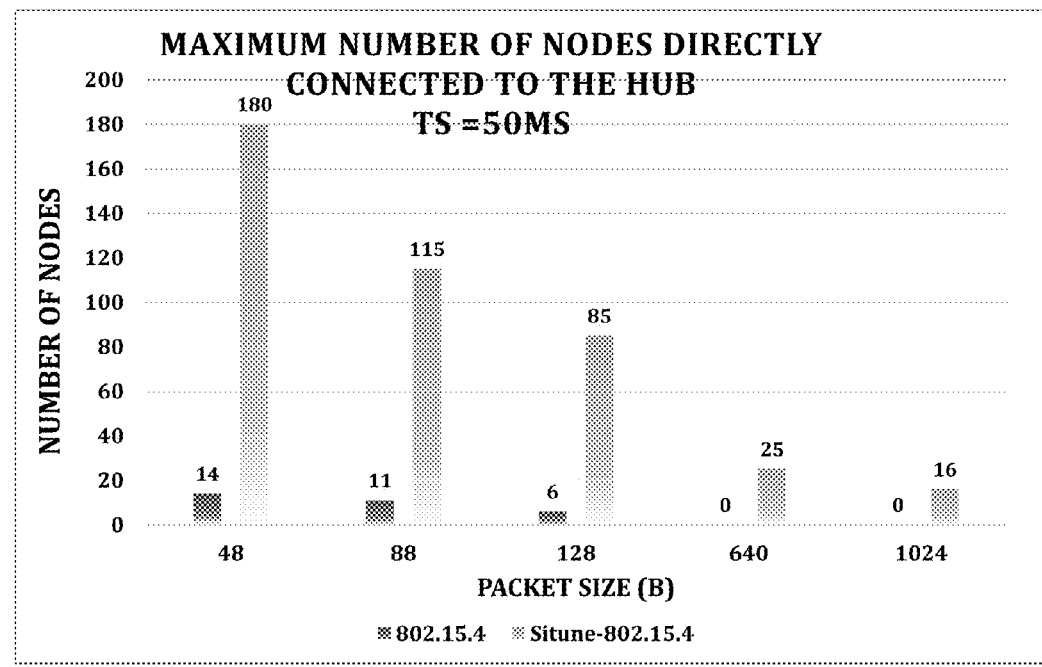
Figure 12:
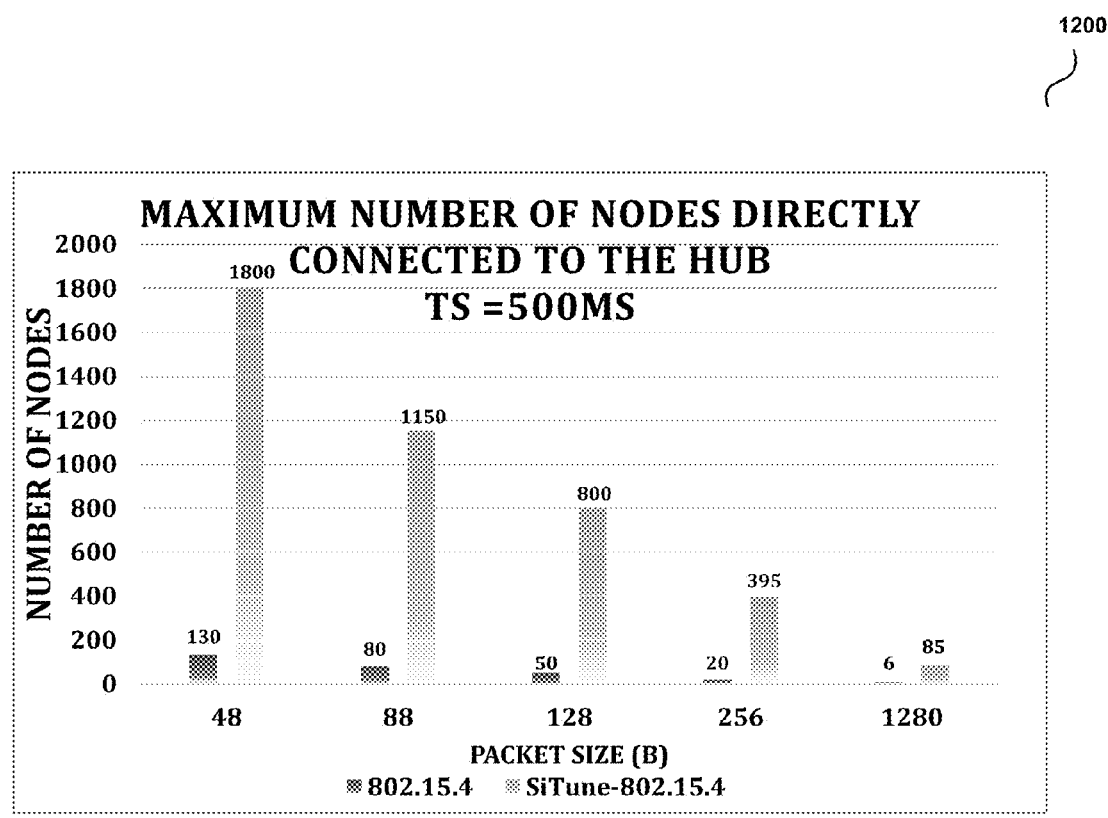
Figure 13:
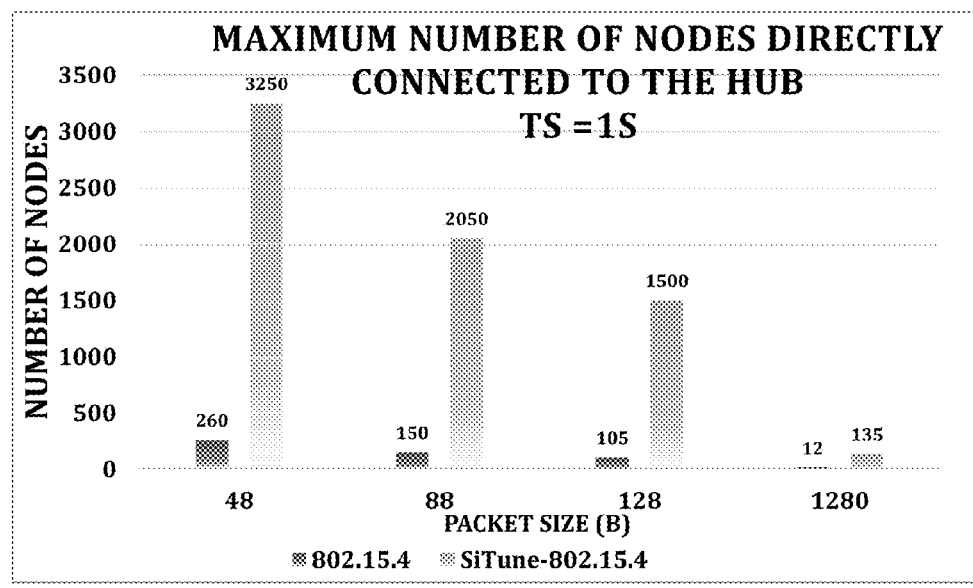
Figure 14:
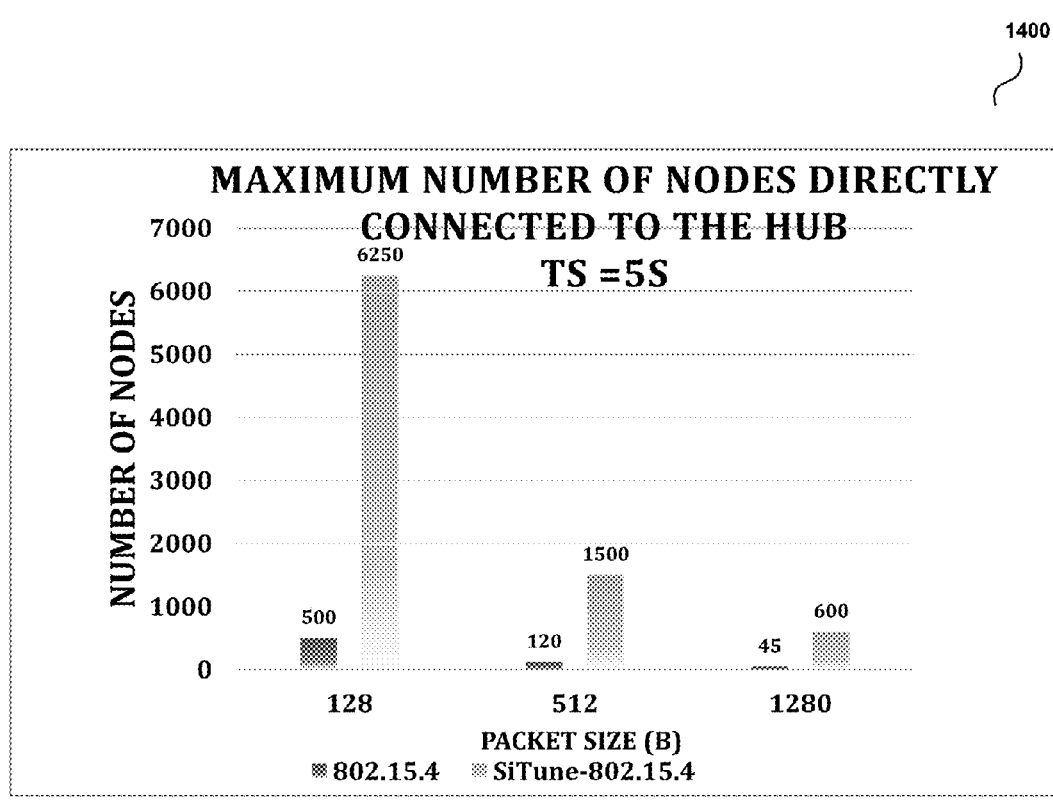

FIGS. 11-14 illustrate a maximum number of nodes that can stay connected to a hub when a packet loss is below 10% and $t_s$ is set to be 50 ms, 500 ms, 1 s and 5 s, respectively, in accordance with various examples of the present technology. In these examples, the packet loss is obtained by taking into account a total number of packets successfully received from all children nodes and a total number of packets generated at an application layer and sent to a MAC layer in all children nodes. A packet loss ratio is determined by dividing a difference between the total number of packets successfully received and the total number of packets generated, by the total number of packets generated. If a packet loss is below 10%, upper layer packet loss recovery protocols can successfully perform re-transition protocols until they are successfully received at the root. However, when a packet loss is above 10%, the upper layer re-transmission protocols may fail. In these simulations, we were able to find a maximum number of nodes that can stay connected (i.e. with less than 10% network packet loss) using the present technology for both 802.15.4 and 802.15.4. FIG. 10 illustrates a packet loss ratio for various packet sizes when $t_s$=50 ms in accordance with various examples of the present technology. It can be seen that, as a number of active nodes increases, packet losses grow much slower comparing with conventional systems. This is because that more successful packet transmissions can be achieved using the present technology. Therefore, a maximum number of nodes, as illustrated by FIGS. 11-14, in an exemplary system using the present technology can be more than 10 times than that of a conventional system. In addition, comparing with convention systems, the maximum number of nodes in the exemplary system is increased while packet delays in the exemplary system are reduced and packet losses stay below 10%.

Various examples of the present disclosure provide methods for dynamically and simultaneously assigning channels among multiple nodes communicating with multiple communication protocols in a network. While specific examples have been cited above showing how the optional operation may be employed in different instructions, other examples may incorporate the optional operation into different instructions. For clarity of explanation, in some instances the present disclosure may be presented as including individual functional blocks including functional blocks comprising devices, device components, steps or routines in a method embodied in software, or combinations of hardware and software.

The various examples can be further implemented in a wide variety of operating environments, which in some cases can include one or more computing devices which can be used to operate any of a number of applications. The one or more processors or computing devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

To the extent examples, or portions thereof, are implemented in hardware, the present technology may be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Most examples utilize at least one network that would be familiar to those skilled in the art for supporting communications using any of a variety of commercially-available protocols, such as TCP/IP, OSI, FTP, UPnP, NFS, CIFS, AppleTalk etc. The network can be, for example, a local area network, a wide-area network, a virtual private network, the Internet, an intranet, an extranet, a public switched telephone network, an infrared network, a wireless network and any combination thereof.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include server computers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The wideband receiver can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared computing device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate examples may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and computing media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various examples.

The foregoing description of examples of the present technology has been provided for the purposes of illustration and description. It is not intended to be exhaustive or to limit the invention to the precise forms disclosed. Many modifications and variations will be apparent to one of ordinary skill in the relevant arts. For example, steps preformed in the examples of the present technology disclosed can be performed in alternate orders, certain steps can be omitted, and additional steps can be added. The examples were chosen and described in order to best explain the principles of the present technology and its practical application, thereby enabling others skilled in the art to understand the present technology for various examples and with various modifications that are suited to the particular used contemplated. It is intended that the scope of the present technology be defined by the claims and their equivalents.

What is claimed is:

1. A wireless hub, comprising:
   a multi-band radio frequency (RF) front end component configured to receive signals from a plurality of nodes in a network, the plurality of nodes communicating with the wireless hub using two or more communication protocols;
   a processor; and
   a non-transitory computer-readable medium storing instructions that, when executed by the processor, cause the wireless hub to perform operations comprising:
   gathering channel status information of the plurality of nodes;
   checking statuses of one or more channels assigned for each of the two or more communication protocols;
   generating a free channel list including at least one channel that has a noise level below a threshold noise level;
   determining a first group of channels from the free channel list to be assigned to a first group of nodes that communicates using a first protocol of the two or more communication protocols;
   in response to determining that a first node of the first group of nodes does not have any assigned channel, assigning a first channel in the first group of channels to the first node, wherein, among the first group of channels, the first channel is associated with a lowest number of nodes as a free channel;
   determining a second group of channels from the free channel list to be assigned to a second group of nodes that communicates using a second protocol of the two or more communication protocols;
   monitoring a signal-to-noise ratio (SNR) level of the one or more channels assigned for each of the two or more communication protocols;
   in response to determining that a specific channel assigned to a corresponding node of the plurality of nodes has the SNR level below a threshold SNR level, reassigning the corresponding node to a new channel; and
   setting a channel status of the specific channel to a busy status to prevent the specific channel from being assigned to any additional channel.

2. The wireless hub of claim 1, wherein the computer-readable medium storing instructions that, when executed by the processor, cause the wireless hub to perform operations further comprising:
gathering a new channel status information of the plurality of nodes; and
in response to the new channel status information being inconsistent with the channel status information, rechecking the channel status information of the plurality of nodes.

3. The wireless hub of claim 1, wherein the channel status information includes at least one of a busy_status or a free_status, the busy_status indicating a corresponding channel having a noise level above the threshold noise level, the free_status indicating a corresponding channel having a noise level below the threshold noise level.

4. The wireless hub of claim 1, wherein the computer-readable medium storing instructions that, when executed by the processor, cause the wireless hub to perform operations further comprising:
generating a first channel list for the first group of channels employing the first protocol, the first channel list comprising the channel status information of the first group of channels and one or more nodes associated with each of the first group of channels; and
generating a second channel list for the second group of channels employing the second protocol, the second channel list comprising the channel status information of the second group of channels and one or more nodes associated with each of the second group of channels.

5. The wireless hub of claim 1, wherein the computer-readable medium storing instructions that, when executed by the processor, cause the wireless hub to perform operations further comprising:
determining a noise level for each of the one or more channels; and
in response to determining that a specific channel of the one or more channels has a noise level above the threshold noise level, removing the specific channel from the free channel list.

6. The wireless hub of claim 1, wherein a number of the first group of channels is equal to a floor of an available bandwidth for the first group of nodes divided by an associated channel bandwidth of the first protocol.

7. The wireless hub of claim 1, wherein the computer-readable medium storing instructions that, when executed by the processor, cause the wireless hub to perform operations further comprising:
sorting the plurality of nodes based upon assigned channel numbers;
determining a difference between a received signal power of each node of the plurality of nodes and signal powers of one or more adjacent channels; and
in response to determining that the difference of a corresponding node is above an adjacent-channel-rejection threshold, causing the corresponding node to reduce transmission power based upon an assigned transmission level associated with a communication protocol of the corresponding node.

8. The wireless hub of claim 7, wherein the received signal power of each node of the plurality of nodes is determined based upon a hello message received from a corresponding node.

9. The wireless hub of claim 1, wherein the two or more communication protocols comprise at least IEEE 802.11 and IEEE 802.15.4.

10. A computer-implemented method, comprising:
gathering, at a wireless hub of a network, channel status information of a plurality of nodes in the network, the plurality of nodes communicating with the wireless hub using two or more communication protocols;
checking statuses of one or more channels assigned for each of the two or more communication protocols;
generating a free channel list including at least one channel that has a noise level below a threshold noise level;
determining a first group of channels from the free channel list to be assigned to a first group of nodes that communicates using a first protocol of the two or more communication protocols;
in response to determining that a first node of the first group of nodes does not have any assigned channel, assigning a first channel in the first group of channels to the first node, wherein, among the first group of channels, the first channel is associated with a lowest number of nodes as a free channel;
determining a second group of channels from the free channel list to be assigned to a second group of nodes that communicates using a second protocol of the two or more communication protocols;
monitoring a signal-to-noise ratio (SNR) level of the one or more channels assigned for each of the two or more communication protocols;
in response to determining that a specific channel assigned to a corresponding node of the plurality of nodes has the SNR level below a threshold SNR level, reassigning the corresponding node to a new channel; and
setting a channel status of the specific channel to a busy status to prevent the specific channel from being assigned to any additional channel.

11. The computer-implemented method of claim 10, further comprising:
gathering a new channel status information of the plurality of nodes; and
in response to the new channel status information being inconsistent with the channel status information, rechecking the channel status information of the plurality of nodes.

12. The computer-implemented method of claim 10, wherein the channel status information includes at least one of a busy_status or a free_status, the busy_status indicating a corresponding channel having a noise level above the threshold noise level, the free_status indicating a corresponding channel having a noise level below the threshold noise level.

13. The computer-implemented method of claim 10, further comprising:
generating a first channel list for the first group of channels employing the first protocol, the first channel list comprising the channel status information of the first group of channels and one or more nodes associated with each of the first group of channels; and
generating a second channel list for the second group of channels employing the second protocol, the second channel list comprising the channel status information of the second group of channels and one or more nodes associated with each of the second group of channels.

14. The computer-implemented method of claim 10, further comprising:
determining a noise level for each of the one or more channels; and in response to determining that a specific channel of the one or more channels has a noise level above the threshold noise level, removing the specific channel from the free channel list.

15. The computer-implemented method of claim 10, wherein a number of the first group of channels is equal to a floor of an available bandwidth for the first group of nodes divided by an associated channel bandwidth of the first protocol.

16. The computer-implemented method of claim 10, further comprising:
    sorting the plurality of nodes based upon assigned channel numbers;
    determining a difference between a received signal power of each node of the plurality of nodes and signal powers of one or more adjacent channels; and
    in response to determining that the difference of a corresponding node is above an adjacent-channel-rejection threshold, causing the corresponding node to reduce transmission power based upon an assigned transmission level associated with a communication protocol of the corresponding node.

17. The computer-implemented method of claim 16, wherein the received signal power of each node of the plurality of nodes is determined based upon a hello message received from a corresponding node.

18. The computer-implemented method of claim 16, wherein the two or more communication protocols comprise at least IEEE 802.11 and IEEE 802.15.4.

* * * * *